US011205979B2

United States Patent
Li et al.

(10) Patent No.: US 11,205,979 B2
(45) Date of Patent: Dec. 21, 2021

(54) FAULT TOLERANT MOTOR AND ZONE CONTROLLER APPARATUS

(71) Applicant: Eaton Intelligent Power Limited, Dublin (IE)

(72) Inventors: Jin Li, Menomonee Falls, WI (US); Huaqiang Li, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/985,606

(22) Filed: Aug. 5, 2020

(65) Prior Publication Data
US 2021/0058015 A1 Feb. 25, 2021

Related U.S. Application Data

(60) Provisional application No. 62/890,227, filed on Aug. 22, 2019.

(51) Int. Cl.
*H04L 29/06* (2006.01)
*H02P 5/50* (2016.01)
*F25B 31/02* (2006.01)
*B65G 23/22* (2006.01)

(52) U.S. Cl.
CPC ............... *H02P 5/50* (2013.01); *B65G 23/22* (2013.01); *F25B 31/02* (2013.01)

(58) Field of Classification Search
CPC .. H02P 5/50; H02P 29/028; H02P 5/74; H02P 5/46; F25B 31/02; B65G 23/22; B65G 43/10
See application file for complete search history.

(56) References Cited

U.S. PATENT DOCUMENTS

| 5,228,558 A | 7/1993 | Hall |
| 5,267,638 A | 12/1993 | Doane |
| 5,285,887 A | 2/1994 | Hall |
| 5,862,907 A | 1/1999 | Taylor |
| 6,459,224 B2 | 10/2002 | Itoh et al. |
| 6,731,094 B1 | 5/2004 | Itoh et al. |
| 6,848,933 B1 | 2/2005 | Delaney, III et al. |

(Continued)

OTHER PUBLICATIONS

Hytrol EZLogic Accumulation System, Gen3, IOP Solutions Manual, Bulletin No. 586, Hytrol Conveyor Co., Inc. (2007), 40 pages.

(Continued)

*Primary Examiner* — Muhammad S Islam
(74) *Attorney, Agent, or Firm* — DiBerardino McGovern IP Group LLC

(57) ABSTRACT

A motor and zone controller apparatus includes: a first motor drive; a second motor drive; and a switching apparatus. The switching apparatus includes: a first switching network having at least a first state and a second state, the first switching network connects the first motor drive to a first motor when in the first state, and the first switching network connects the first motor drive to a second motor when in the second state; and a second switching network having at least a first state and a second state, the second switching network connects the second motor drive to the first motor when in the first state, and the second switching network connects the second motor drive to the second motor when in the second state.

20 Claims, 9 Drawing Sheets

(56) References Cited

U.S. PATENT DOCUMENTS

| | | | |
|---|---|---|---|
| 6,860,381 | B2 | 3/2005 | Newsom et al. |
| 6,873,882 | B2 | 3/2005 | Tachibana et al. |
| 7,207,433 | B2 | 4/2007 | Schaefer |
| 7,360,638 | B2 | 4/2008 | Ko et al. |
| 7,542,823 | B2 | 6/2009 | Nagai |
| 10,003,294 | B2* | 6/2018 | Hara ................ H02P 29/026 |
| 11,038,340 | B2* | 6/2021 | Li .................... H02H 7/0816 |
| 2002/0084173 | A1 | 7/2002 | Paquette |
| 2005/0192704 | A1 | 9/2005 | Wielebski et al. |
| 2007/0024218 | A1 | 2/2007 | Nagai |
| 2007/0261941 | A1 | 11/2007 | Pelak et al. |
| 2019/0104205 | A1* | 4/2019 | Xu ................... G05B 19/4185 |

OTHER PUBLICATIONS

Hytrol 24-Volt Conveyor (2015), available at https://hytrol.com/Products/Accumulation/24-Volt-Conveyor, last visited Aug. 5, 2020.

Automation Controls Group—Controls (2013), available at http://www.automationcontrolsgroup.com/products/controls, last visited Aug. 5, 2020.

Interroll Drives and Controls (2018), available at https://www.interroll.us/products/drives-andcontrols/controls-drivers/, last visited Aug. 5, 2020.

Interroll Conveyors and Sorters (2015), available at https://www.interroll.us/products/conveyors-sorters/, last visited Aug. 5, 2020.

Itoh Denki Driver Cards (2013), available at http://itohdenki.com/products/driver-cards, last visited Aug. 5, 2020.

Pulseroller ConveyLinx (2015), available at https://www.pulseroller.com/controls/conveylinx/, last visited Aug. 5, 2020.

Pulseroller Standard Drive Control (2015), available at https://www.pulseroller.com/controls/drivecards/, last visited Aug. 5, 2020.

Interroll Conveyor Control video, uploaded Sep. 9, 2012, available at https://www.youtube.com/watch?v=ahRBchY90S0, last visited Aug. 5, 2020.

Interroll Conveyor Modules video, uploaded May 18, 2014, available at https://www.youtube.com/watch?v=F-_WSaTn7FA, last visited Aug. 5, 2020.

* cited by examiner

FAULT TOLERANT MOTOR AND ZONE CONTROLLER APPARATUS

CROSS-REFERENCE TO RELATED APPLICATION

This application claims the benefit of U.S. Provisional Application No. 62/890,227, filed on Aug. 22, 2019 and titled FAULT TOLERANT MOTOR AND ZONE CONTROLLER APPARATUS, which is incorporated herein by reference in its entirety.

TECHNICAL FIELD

This disclosure relates to a fault tolerant motor and zone controller apparatus. The motor and zone controller apparatus is a multi-zone motor controller apparatus.

BACKGROUND

An electric motor converts electrical energy into mechanical energy that is provided to a load. More than one electric motor may be driven and controlled by a multi-zone controller, and the motors may be used to drive part of an industrial process, such as a conveyor belt system.

SUMMARY

In one aspect, a motor and zone controller apparatus includes: a first motor drive; a second motor drive; and a switching apparatus. The switching apparatus includes: a first switching network having at least a first state and a second state, where the first switching network connects the first motor drive to a first motor when in the first state, and the first switching network connects the first motor drive to a second motor when in the second state; and a second switching network having at least a first state and a second state, where the second switching network connects the second motor drive to the first motor when in the first state, and the second switching network connects the second motor drive to the second motor when in the second state.

Implementations may include one or more of the following features. The first switching network may include: a first power delivery switch, and a first sensor switch; and the second switching network may include: a second power delivery switch, and a second sensor switch. When the first switching network is in the first state, the first power delivery switch may be electrically connected to the first motor, and the first sensor switch may be electrically connected to a first output sensor that measures a speed or position of the first motor; when the first switching network is in the second state, the first power delivery switch may be electrically connected to the second motor, and the first sensor switch may be electrically connected to a second output sensor that measures a speed or position of the second motor; when the second switching network is in the first state, the second power delivery switch may be electrically connected to the first motor, and the second sensor switch may be electrically connected to the first output sensor; and when the second switching network is in the second state, the second power delivery switch may be electrically connected to the second motor, and the second sensor switch may be electrically connected to the second output sensor.

The motor and zone controller apparatus also may include: a first zone controller in communication with the first motor drive; and a second zone controller in communication with the second motor drive, where a state of the first switching network is configured to change in response to receiving a command signal from the first zone controller, and a state of the second switching network is configured to change in response to receiving a command from the second zone controller. The first zone controller and the second zone controller may be coupled to a host controller, and the command signal may be received at the first zone controller or the second zone controller from the host controller. The first motor controller may be configured to determine whether the first motor drive is in a critical fault mode, and, if the first motor drive is in the critical fault mode, the command signal from the second motor controller may be configured to control the state of the second switching network such that the second motor drive is connected to the first motor during a first time period and the second motor drive to the second motor during a second time period. In some implementations, if the first motor drive is in the fault mode, the first time period and the second time period are determined by the second zone controller or by the host controller.

The first motor drive may include: a first motor controller, a first power converter, and a first zone controller; and the second motor drive controller includes a second motor controller, a second power converter, and a second zone controller. The first motor drive may include a first motor control processor, the first zone controller may include a first zone control processor, the second motor drive may include a second motor control processor, and the second zone controller may include a second zone control processor. The motor and zone controller apparatus also may include a first bi-directional communication path between the first zone controller and the second zone controller, and a second bi-directional communication path between the first motor controller and the second motor controller. The first motor controller and the first zone controller may be implemented by a first electronic processor, and the second motor controller and the second zone controller may be implemented by a second electronic processor. The first motor controller may be implemented by a first electronic processor, the first zone controller may be implemented by a second electronic processor, the second motor controller may be implemented by a third electronic processor, and the second zone controller may be implemented by a fourth electronic processor.

In another aspect, a control system includes: a host controller coupled to one or more dual-zone motor controller apparatuses, each of the one or more dual-zone motor controller apparatuses including: a first motor drive including a first motor controller configured to generate a first motor power signal; a second motor drive including a second motor controller configured to generate a second motor power signal; a first zone controller coupled to the first motor controller; a second zone controller coupled to the second motor controller; and a switching apparatus including: a first switching network configured to connect the first motor drive to the first motor or the second motor; and a second switching network configured to connect the second motor drive to the first motor or the second motor. When the first motor drive is in a critical fault mode, the host controller or the second zone controller is configured to command the second motor drive to enter a backup mode, and, when in the backup mode, the second motor drive is configured to provide the second motor power signal to the first motor during a first time period and to provide the second motor power signal to the second motor during a second time period; and when the second motor drive is in a critical fault mode, the host controller or the first zone controller is configured to command the first motor drive to enter a backup mode, and, when in the backup mode, the first motor drive is configured to provide the second motor power signal to the second motor during a first time period and to provide the first motor power signal to the second motor during a second time period.

Implementations may include one or more of the following features. The host controller may be coupled to two or more dual-zone motor controller apparatus, and the host controller may be further configured to adjust a speed of one or more motors controlled by another of the dual-zone motor controllers.

In another aspect, a method of operating a system that includes a plurality of motors controlled by a multi-zone motor controller includes: determining whether one of a plurality of motor drives in a multi-zone motor controller is in a critical fault mode; and if at least one of the plurality of motor drives is in the critical fault mode: controlling any one of the plurality of motor drives that is not in the critical fault mode to connect to each of the plurality of motors during a respective time period, each of the time periods being different from all of the other time periods.

Implementations may include one or more of the following features. The system may include two motors controlled by a dual-zone motor controller. Controlling the one of the plurality of motor drives that is in the operating mode to connect to each of the plurality of motors during a respective time period may include controlling a state of a switching network connected to the one of the plurality of motor drives that is not in the fault mode such that the switching network connects the one of the plurality of motor drives that is not in the fault mode to each of the motors at a different time. Controlling the one of the plurality of motor drives that is not in the fault mode to connect to each of the plurality of motors during a respective time period may include receiving a command from a separate electronic processor. The command from a separate electronic processor may be received from a host controller that is physically separate from the multi-zone motor controller apparatus. The command from a separate electronic processor may be received from a zone control processor.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
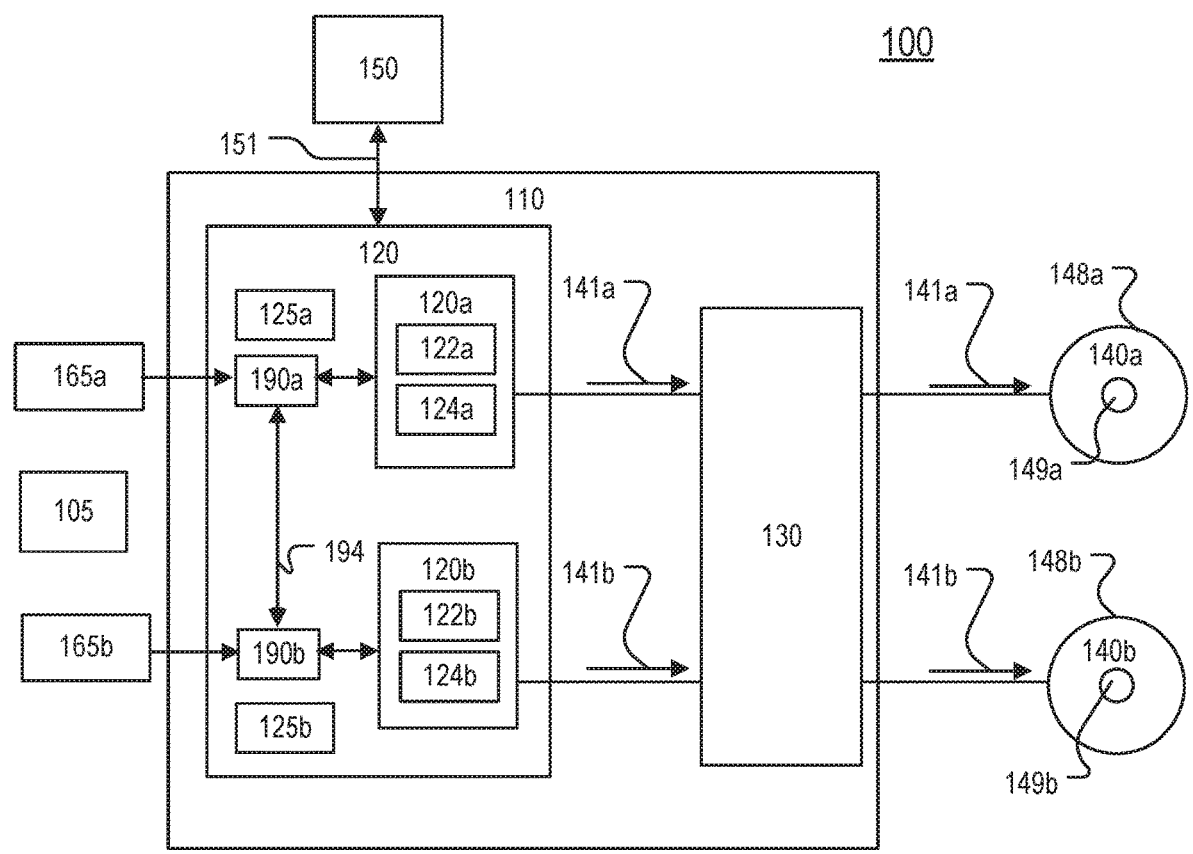
FIG. 1 is a block diagram of an example motor and drive system.
Figure 6:
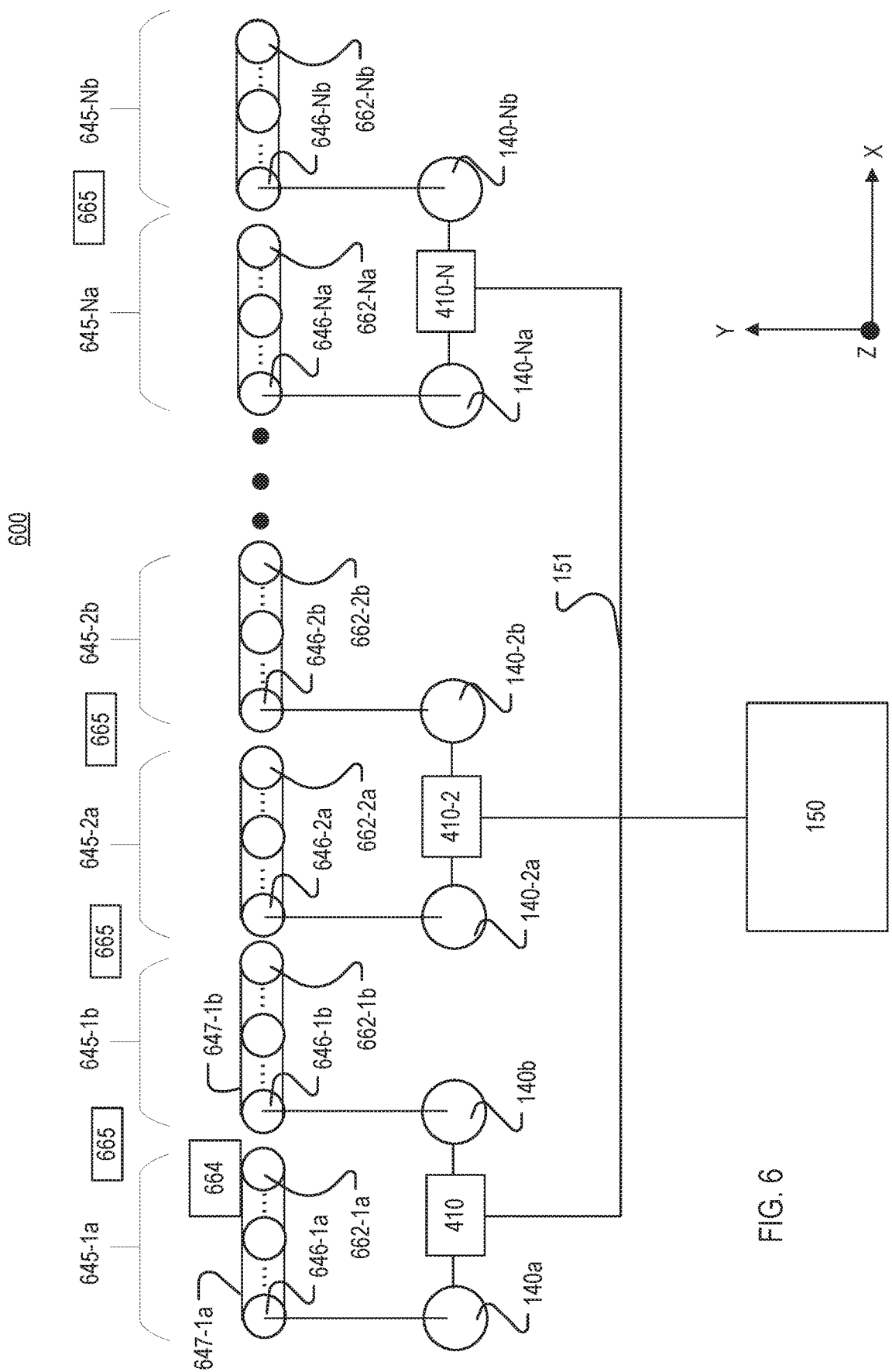
FIG. 6 is an illustration of an example conveying process.

Referring to FIG. 1, a block diagram of a motor and drive system 100 is shown. The motor and drive system 100 may be, for example, part of a conveyor belt system (such as shown in FIG. 6) that is used in, for example, a warehouse, a distribution center, or a manufacturing facility. The motor and drive system 100 may be used in other contexts. For example, the motor and drive system 100 may be part of a heating, ventilation, and air conditioning (HVAC) system, a material handling system, or a pump system.

The motor and drive system 100 includes a motor and zone controller apparatus 110, a first motor 140a, and a second motor 140b. In this example, the motor and zone controller apparatus 110 is a dual-zone motor controller apparatus and is referred to as the dual-zone motor controller apparatus 110. The dual-zone motor controller apparatus 110 provides a fault-tolerant and redundant approach to driving the first motor 140a and the second motor 140b. The first and second motors 140a, 140b are electric motors. The first and second motors 140a, 140b may be direct current (DC) motors or alternate current (AC) motors. For example, the first and second motors 140a, 140b may be brushless DC motors, permanent magnet AC motors, or AC induction motors, just to name a few.

The first motor 140a includes a stator 148a and a rotor 149a. The second motor 140b includes a stator 148b and a rotor 149b. Each stator 148a, 148b includes one winding per phase. The rotors 149a, 149b rotate relative to the stators 148a, 148b in response to receiving a motor power signal. The motor power signal may be a three-phase AC electrical signal, with one phase of the signal being applied to each of three phase windings in the stator. The motor power signal has a voltage and current sufficient to drive the motors 140a, 140b. Although the first and second motors 140a, 140b are three-phase motors in this example, in other examples, the first and second motors 140a, 140b may be single-phase motors.

The dual-zone motor controller apparatus 110 includes a motor drive system 120, which includes a first motor drive 120a and a second motor drive 120b. The dual-zone motor controller apparatus 110 also includes a switching network 130 between the motor drive system 120 and the motors 140a, 140b. Each of the first motor drive 120a and the second motor drive 120b includes a respective motor controller 122a, 122b and a respective power converter 124a, 124b.

FIG. 1 shows the dual-zone motor controller apparatus 110 at a time when both the first motor drive 120a and the second motor drive 120b are operating in a typical manner and as expected. When the first and second motor drive 120a and 120b operate as expected, they are in a ready mode and no fault conditions exist. In typical and expected operation where no fault conditions exist, the first motor drive 120a generates a first motor power signal 141a, and the second motor drive 120b generates a second motor power signal 141b. The first motor power signal 141a and the second motor power signal 141b are AC electrical signals that include one phase for each of the three phase windings in stators 148a, 149b.

When the first motor drive 120a and the second motor drive 120b are in the ready mode, the switching network 130 electrically connects the first motor drive 120a to the first motor 140a, and the switching network 130 electrically connects the second motor drive 120b to the second motor 140b. The first motor 140a receives the first motor power signal 141a, and the second motor 140b receives the second motor power signal 141b. The first motor 140a operates at a speed and torque determined by the first motor power signal 141a, and the second motor 140b operates at a speed and torque indicated by the second motor power signal 141b.

In addition to the ready mode, the first motor drive 120a and the second motor drive 120b have a fault mode. The first motor drive 120a and the second motor drive 120b may enter the fault mode due to, for example, overheating, over current, over voltage, and/or other component failures. The first motor drive 120a does not generate the first motor power signal 141a (or does not generate a usable motor power signal 141a) in the fault mode, or the second motor drive 120b does not generate the second motor power signal 141b (or does not generate a usable motor power signal 141b) in the fault mode. In other words, when in the fault mode, the first motor drive 120a or the second motor drive 120b are unable to operate a motor in an acceptable manner.

The dual-zone motor controller apparatus 110 also includes first and second zone controllers 190a, 190b. The first zone controller 190a controls the first motor controller 122a and reports back to a host controller 150. The second zone controller 190b controls the second motor controller 122b and reports back to the host controller 150. The host controller 150 may be, for example, a programmable logic controller (PLC). Additional information about the host controller 150 is discussed below with respect to FIG. 3.

The first and second zone controllers 190a, 190b communicate with the host controller via a communications link 151. The communications link 151 is any type of wired or wireless bi-directional combinations path. For example, the communications link 151 may allow the host controller 150 and the dual-zone motor controller apparatus 110 to communicate using, for example, an automation protocol (such as, for example, Fieldbus or Modbus), TCP/IP, a protocol based on the IEEE 801.11 standard (WiFi), any IP-based protocol that is capable of transmitting 3G, 4G, 5G data), Bluetooth, or any other communications protocol that is capable of exchanging data and information.

The first zone controller 190a and the second zone controller 190b also may communicate with each other via a bi-directional communication path 194. The first zone controller 190a and the second zone controller 190b also communicate with respective first and second sensors 165a and 165b. The sensors 165a and 165b monitor one or more properties of an industrial process 105. The industrial process 105 has a condition that is controlled by a device or system that is driven by the motors 140a, 140b. For example, the industrial process 105 may be a conveying process that includes a conveyor belt that is configured to be moved by the motors 140a, 140b. In this example, the sensors 165a and 165b may be an optical sensor or any other type of sensor that monitors package location on the conveyor belt. In another example, the process 105 is a climate control process. In this example, the sensors 165a and 165b are environmental sensors that monitor the environmental conditions (such as, for example, temperature and/or humidity) within a space that is heated and/or cooled by a system that uses the motors 140a and 140b. The zone controllers 190a, 190b may receive data from the respective sensor 165a, 165b in any manner possible. For example, the sensor 165a may push data to the first zone controller 190a, and the sensor 165b may push data to the second zone controller 190b. Alternatively or additionally, the first zone controller 190a may poll the sensor 165a for data, and the second zone controller 190b may poll the sensor 165b for data.

The first zone controller 190a controls the first motor drive 120a. For example, the first zone controller 190a may issue a command to the first motor drive 120a that causes the first motor drive 120a to generate the first motor power signal 141a. The zone controller 190a may issue the command based on data from the sensor 165a, the first motor drive 120a, the second motor drive 120b, and the host controller 150. The first zone controller 190a also reports information to the host controller 150. For example, the first zone controller 190a may provide a failure indication to the host controller 150 when the first motor drive 120a is in a fault mode. Moreover, the first zone controller 190a and the second zone controller 190b are able to communicate with each other directly regarding operating status via the communication path 194. For example, the zone controller 190a may provide an failure indication to the zone controller 190b when the first motor drive 120a is in a fault mode. The zone controller 190b may provide a failure indication to the zone controller 190a when the second motor drive 120b is in a fault mode.

Similarly, the second zone controller 190b controls the second motor drive 120b. The second zone controller 190b may control the second motor drive 120b based on information from the sensor 165b, the first motor drive 120a, the second motor drive 120b, and the host controller 150. The second zone controller 190b also communicates with the host controller 150. The second zone controller 190b also reports information to the host controller 150. For example, the second zone controller 190b may provide a failure indication to the host controller 150 when the second motor drive 120b is in a fault mode.

Figure 4A:
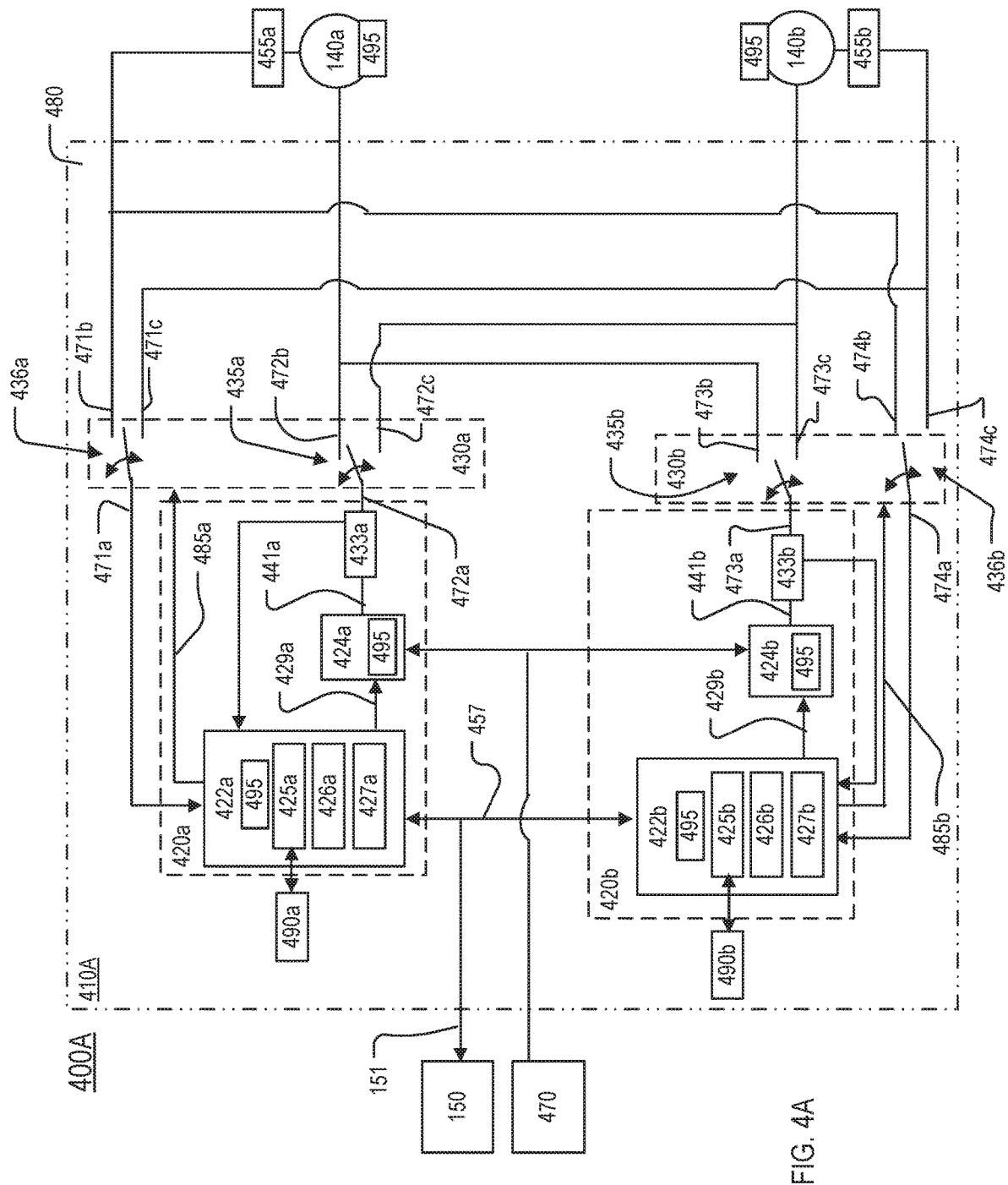
FIGS. 4A and 4B are block diagrams of examples dual-zone motor controller apparatuses.

The dual-zone motor controller apparatus 110 may include two electronic processing modules or four electronic processing modules. The implementation shown in FIG. 1 includes two electronic processing modules 125a, 125b. The electronic processing module 125a executes a collection instructions that implement aspects of the first zone controller 190a and the first motor controller 122a. The electronic processing module 125b executes instructions that implement the second zone controller 190b and the second motor controller 122b. In other words, the first zone controller 190a and the first motor controller 122a may be implemented by one electronic processing module 125a, and the second zone controller 190b and the second motor controller 122b may be implemented by one electronic processing module 125b such that the dual-zone motor controller apparatus 110 includes two electronic processors. FIG. 4A shows another example of an implementation of the dual-zone motor controller apparatus 110 that includes two electronic processors.

Figure 4B:
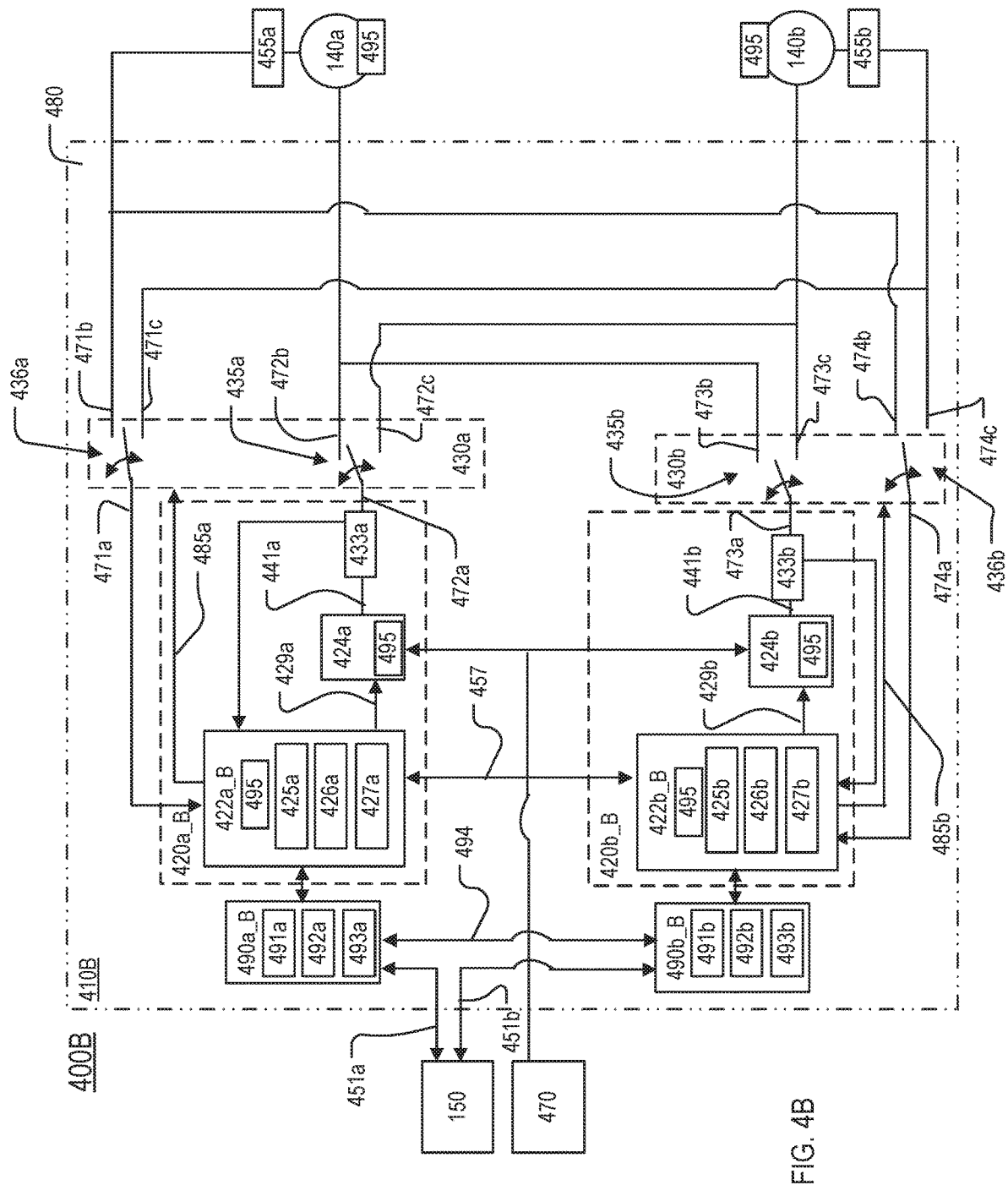

In other implementations, the dual-zone motor controller apparatus 110 includes four electronic processing modules. In these implementations, separate electronic processing modules perform instructions to implement each of the first zone controller 190a, the first motor controller 122a, the second zone controller 190a, and the second motor controller 122b. FIG. 4B shows an example of an implementation of the dual-zone motor controller apparatus 110 that includes four electronic processing modules.

When the first motor drive 120a or the first motor drive 120b enters the fault mode, a fault indication is provided to an electronic processor (for example, an electronic processor in the host controller 150, an electronic processor that implements the zone controller associated with the failed motor drive, or an electronic processor in the non-faulted motor drive). In response to the receiving the fault indication, the good motor drive (the motor drive that is not in the fault mode) enters a backup mode per a command from the non-failed zone controller and/or the host controller 150.

In the backup mode, the dual-zone motor controller apparatus 110 uses the motor drive that is in the ready mode to drive both of the motors 140a, 140b. The switching network 130 alternates between electrically connecting the motor 140a and the motor 140b to the motor drive that is in the ready mode. This allows the motor and drive system 100 to continue operation until the drive that is in the fault mode is replaced or repaired.

Figure 2A:
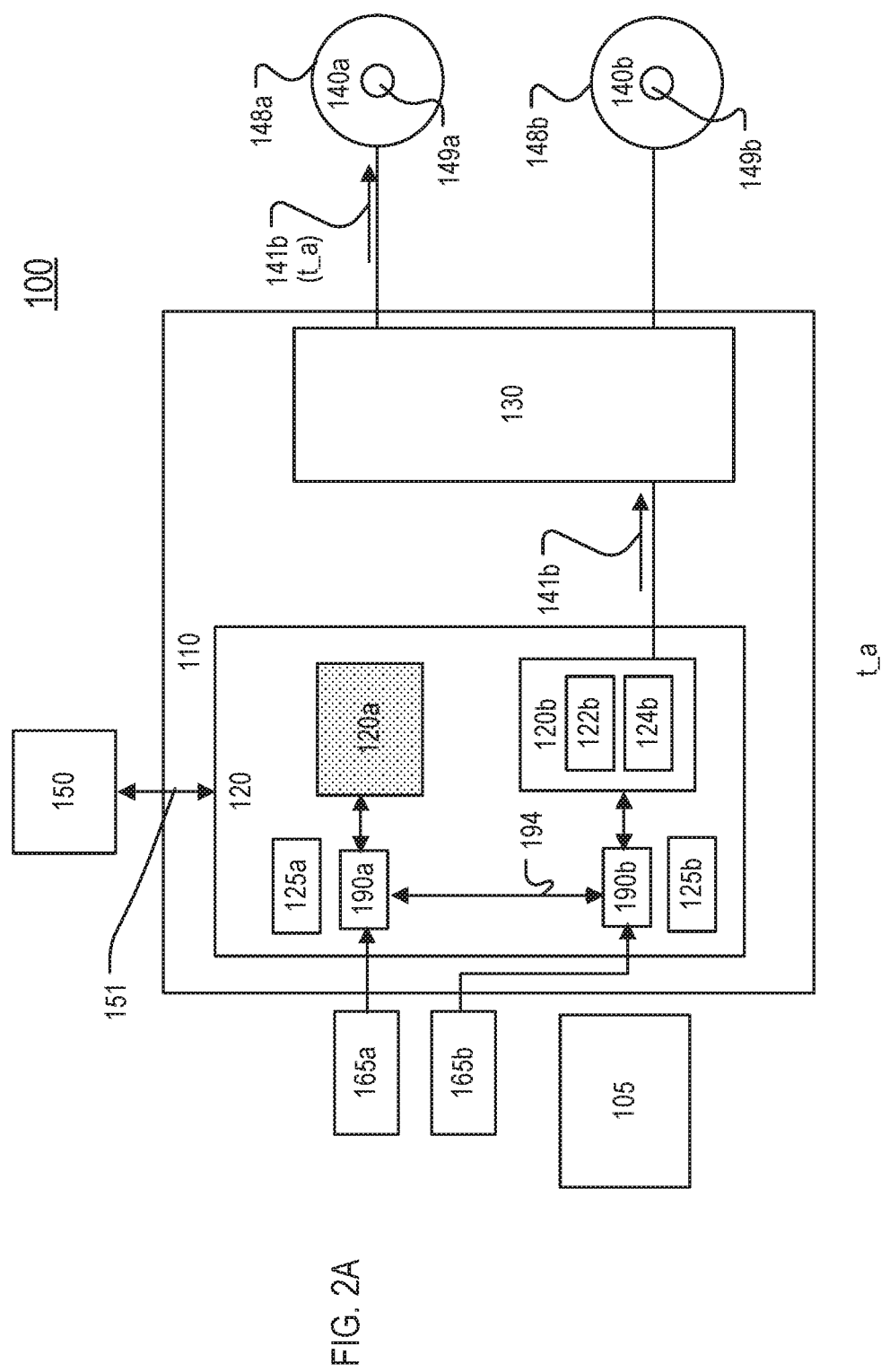
FIGS. 2A and 2B show the motor and drive system of FIG. 1 operating in a backup mode.
Figure 2B:
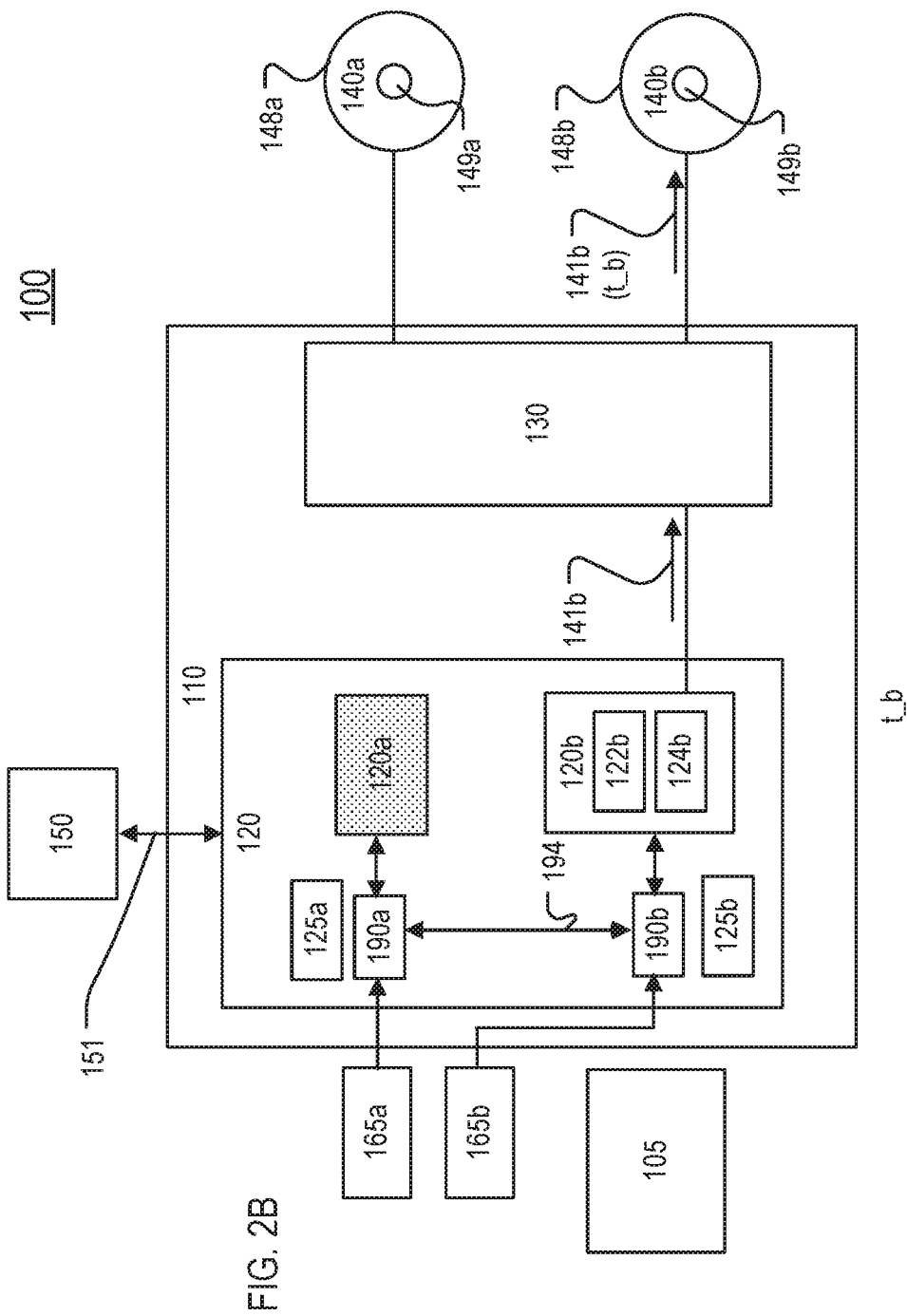

FIGS. 2A and 2B show an example of the motor and drive system 100 operating in the backup mode. In the example of FIGS. 2A and 2B, the motor drive 120a is in the fault mode (shown with grey dotted shading) and the motor drive 120b is in the ready mode. At the time t_a (FIG. 2A), the switching network 130 electrically connects the motor 140a to the second motor drive 120b. At the time t_b (FIG. 2B), the switching network 130 electrically connects the motor 140b to the second motor drive 120b.

The times t_a and t_b are different times. In the example of FIGS. 2A and 2B, the times t_a and t_b are determined by the zone controller 190b based on information from the sensor 165a, 165b, and/or from the host controller 150. The time t_a is a time period during which the process 105 uses the motor 140a. For example, if the process 105 is a conveying process, the time t_a is the time during which the zone controller 190b determines that packages are on a portion of a conveyor belt driven by the motor 140a based on data from the sensor 165a and/or the sensor 165b. The time t_b is the time during which the zone controller 190b determines that packages are on a different portion of the conveyor belt that is driven by the motor 140b based on data from the sensor 165a and/or the sensor 165b.

In the backup mode, only one of the motors 140a, 140b receives the motor power signal 141b at any given time and only one of the motors 140a, 140b is actively driven at any given time. Although both of the motors 140a, 140b are not actively driven simultaneously during the backup mode, the motor and drive system 100 maintains some level of acceptable operation because one of the motors 140a, 140b is actively driven and operates in the usual manner.

On the other hand, the legacy or traditional approach for a dual-zone motor controller does not include the switching network 130. Thus, in the legacy or traditional approach, one of the motors attached to the dual-zone motor control is incapable of being operated at all when a motor drive fails. In an application that involves a conveying process (such as a conveyor belt), the failure of a motor leads to an interruption in the conveying process and possibly loss of production time. By providing a backup mode and employing the switching network 130, the dual-zone motor controller apparatus 110 improves the overall performance of the motor and drive system 100 by reducing downtime of the motor and drive system 100 (and the application that relies on the motor and drive system 100), making more efficient use of the components and subsystems within the dual-zone motor controller apparatus 110, and increasing the overall robustness of the motor and drive system 100 (and the application that relies on the motor and drive system 100).

Figure 3:
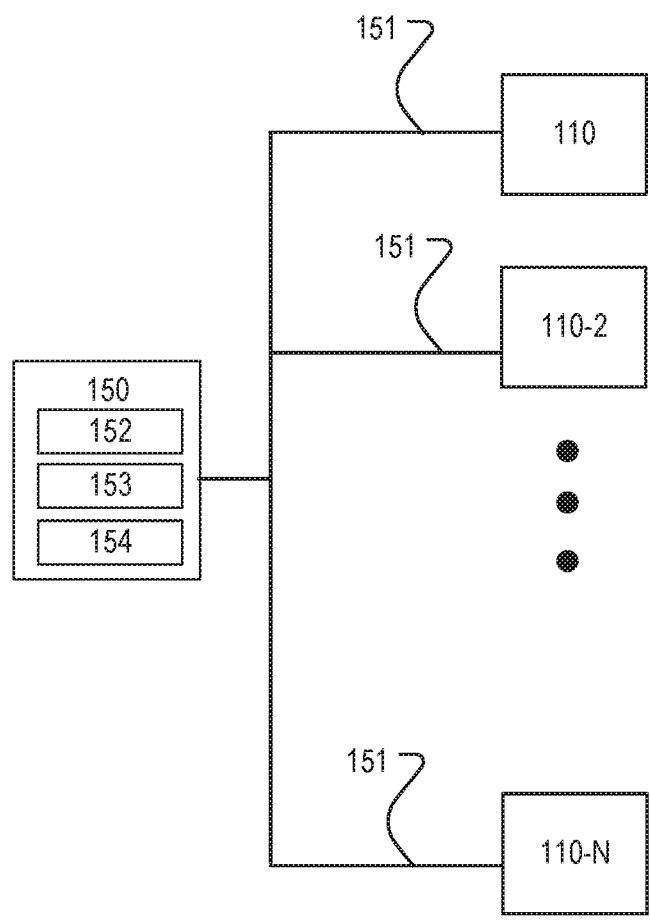
FIG. 3 is a block diagram of an example of a host controller and a plurality of instances of a dual-zone motor controller apparatus.

Referring to FIG. 3, a block diagram of an implementation in which the host controller 150 is connected to N instances of the dual-zone motor controller apparatus 110 is shown. In addition to the dual-zone motor controller apparatus 110, FIG. 3 shows instances 110-2 to 110-N, where N is an integer number that is greater than one. Each instance of the dual-zone controller apparatus 110 to 110-N is connected to the host controller 150 via a communications link 151. As discussed above, the communications link 151 is any type of wired or wireless bi-directional combinations path that allows the host controller 150 and the dual-zone motor controller apparatus 110 to communicate. The host controller 150 receives data (such as fault indications) and provides command signals to all of the dual-zone controller apparatuses 110 to 110-N.

The host controller 150 includes an electronic processing module 152, an electronic storage 153, and an input/output (IO) interface 154. The electronic processing module 152 includes one or more electronic processors of any type, and the electronic storage 153 includes any type of electronic memory that is capable of permanently or temporarily storing data. The electronic processing module 152 and the electronic storage are coupled such that the electronic processing module 152 may read data to and/or write data from the electronic storage 153. The I/O interface 154 is any type of interface that allows an external machine or operator to communicate with the host controller 150. For example, the I/O interface 154 may be or include a network or communications interface that connects to the link 151 and enables data to be sent from and received by the host controller 150. The host controller 150 may be, for example, an industrial controller such as a programmable logic controller (PLC).

The host controller 150 and the dual-zone motor controller apparatus 110 may communicate using, for example, an automation protocol (such as, for example, Fieldbus or Modbus), TCP/IP, a protocol based on the IEEE 801.11 standard (WiFi), any IP-based protocol that is capable of transmitting 3G, 4G, 5G data), Bluetooth, or any other communications protocol that is capable of exchanging data and information.

Referring to FIG. 4A, a block diagram of a motor and drive system 400A is shown. The motor and drive system 400A includes a motor and zone controller apparatus 410A. The motor and zone controller apparatus 410A is a dual-zone motor controller apparatus and is referred to as the dual-zone motor controller apparatus 410A. The dual-zone motor controller apparatus 410A is an example of an implementation of the dual-zone motor controller apparatus 110 of FIG. 1.

The dual-zone motor controller apparatus 410A includes a first motor drive 420a and a second motor drive 420b. Under typical operation, the first motor drive 420a produces a motor power signal 441a, and the second motor drive 420b produces a motor power signal 441b. The first motor drive 420a includes a first motor controller 422a and a first power converter 424a. The second motor drive 420b includes a second motor controller 422b and a second power converter 424b.

The first motor controller 422a includes an electronic processing module 425a, an electronic storage 426a, and an I/O interface 427a. A first zone controller 490a controls the first motor controller 422a. The first zone controller 490a performs in a manner similar to the first zone controller 190a discussed with respect to FIG. 1. The first zone controller 490a is implemented as a collection of instructions that are stored on the electronic storage 426a and executed by the electronic processing module 425a. In some implementations, the electronic processing module 425a, the electronic storage 426a, and the I/O interface 427a are implemented as a microcontroller. The first motor controller 422a generates a gating control signal 429a based on measured motor position and speed information and/or based on a sensorless technique that estimates or calculates the motor position and speed.

The electronic processing module 425a includes one or more electronic processors. The electronic processors of the module 425a may be any type of electronic processor, may be multiple types of processors, and may or may not include a general purpose central processing unit (CPU), a graphics processing unit (GPU), a microcontroller, a field-programmable gate array (FPGA), Complex Programmable Logic Device (CPLD), a digital signal processor (DSP), a microcontroller unit (MCU) and/or an application-specific integrated circuit (ASIC).

The electronic storage 426a may be any type of electronic memory that is capable of storing data and instructions in the form of computer programs or software, and may include multiple types of memory. For example, the electronic storage 426a may include volatile and/or non-volatile components. The electronic storage 426a and the processing module 425a are coupled such that the processing module 425a is able to access or read data from and write data to the electronic storage 426a.

The I/O interface 427a may be any interface that allows a human operator, an external device, and/or an autonomous process to interact with the first motor drive 420a. The I/O interface 427a may include, for example, audio input and/or output (such as speakers and/or a microphone), visual output (such as lights, light emitting diodes (LED)), serial or parallel port, a Universal Serial Bus (USB) connection, and/or any type of network interface, such as, for example, Ethernet. The I/O interface 427a also may allow communication without physical contact through, for example, an IEEE 802.11, Bluetooth, cellular, or a near-field communication (NFC) connection. The dual-zone motor controller apparatus 410A may be, for example, operated, configured, modified, or updated through the I/O interface 427a.

The power converter 424a includes a network of power transistors and/or other components arranged to form an inverter. The power converter 424a receives DC power from an external DC power source 470. The power source 470 provides direct current (DC) power. For example, the power source 470 may supply 24 Volt (V) DC power. The power converter 424a converts the DC power into the motor power signal 441a by modulating the DC power based on the gating control signal 429a. The power converter 424a may implement, for example, a pulse width modulation (PWM) technique to modulate the DC power into the motor power signal 441a. The PWM technique of the power converter 424a may be implemented based on any type of control algorithm, such as, for example, a 6-step electronic commutation, various field oriented controls, a space vector PWM, or a sinusoidal PWM. By controlling the modulation of the DC power with the gating control signal 429a, the amplitude, frequency, and phase of the motor power signal 441a is also controlled such that the motor power signal 441a may be used to operate a motor at a particular torque, speed, and direction.

The first motor power signal 441a is measured by a sensor system 433a. The sensor system 433a includes one or more sensors that are capable of measuring an electrical quantity. For example, the sensor system 433a may include one or more sensors that measure voltage and/or current. The sensor system 433a may include one sensor per phase such that in a three-phase system, the sensor system 433a includes three sensors. The sensor system 433a produces an indication of the amount of an electrical quantity (for example, current and/or voltage) in the first motor power signal 441a at a point in time and provides the indication to the first motor controller 422a.

Each sensor in the sensor system 433a may be, for example, a Rogowski coil, a Hall effect sensor, a voltage sensor or a shunt resistor that measures the voltage across an element (such as a resistor) that has a known impedance. The sensor system 433a provides the indication to the first motor controller 422a. In some implementations, the three-phase line-to-line voltages are measured by three voltage sensors or estimated/calculated by an algorithm in firmware/software based on measured three-phase currents.

The second motor drive 420b includes the second motor controller 422b and the second power converter 424b, which is similar to the power converter 424a. The second motor controller 422b generates a gating control signal 429b based on measured or estimated/calculated motor position and speed information. The second motor controller 422b includes an electronic processing module 425b, an electronic storage 426b, and an I/O interface 427b. These elements are similar, respectively, to the electronic processing module 425a, the electronic storage 426a, the I/O interface 427a, and may be implemented as a microcontroller. A second zone controller 490b controls the second motor controller 422b and is similar to the second zone controller 190b discussed with respect to FIG. 1. The second zone controller 490b is implemented with a collection of instructions that are stored on the electronic storage 426b and executed by the electronic processing module 425a.

The power converter 424b produces the motor power signal 441b based on the gating control signal 429b. The motor power signal 441b is measured by a sensor system 433b. The sensor system 433b is similar to the sensor system 433a. The sensor system 433b produces an indication of property of an electrical quantity (for example, amplitude and/or phase of voltage and/or current) of the second motor power signal 441b and provides the indication to the second motor controller 422b. The sensor system 433b includes one or more electrical sensors (for example, current and/or voltage sensors) and may include one sensor per phase. In some implementations, the three-phase line-to-line voltages are measured by three voltage sensors or estimated/calculated by an algorithm in firmware/software based on the three-phase currents measured.

The dual-zone motor controller apparatus 410A also includes a switching network 430a and a switching network 430b. The switching network 430a includes a first power delivery switch 435a and a first sensor switch 436a. The switching network 430b includes a second power delivery switch 435b and a second sensor switch 436b. As discussed below, the switching networks 430a and 430b determine which motor drive 420a, 420b provides a motor power signal and which motor 140a, 140b receives a motor power signal.

The switching networks 430a and 430b are implemented with a collection of electronic components that are arranged in any topology such that each of the first power delivery switch 435a, the second power delivery switch 435b, the first sensor switch 436a, and the second sensor switch 436b may conduct current between a first terminal and either of two other terminals. Each switch 435a, 435b, 436a, 436b has at least two stable states in which current may flow. The two stable states are referred to as the state A and the state B in the discussion below. In addition to the two stable states A and B, each switch 435a, 435b, 436a, 436b may be placed in a neutral (or disconnected) state. The switch 435a, 435b, 436a, 436b cannot conduct current when in the neutral state. The electronic components used in the switching networks 430a and 430b may include, for example, relays, resistors, capacitors, and/or power semiconductor devices. The power semiconductor devices may include, for example, metal oxide semiconductor field effect transistors (MOSFET), insulated-gate bipolar transistors (IGBT), Silicon-Carbide (SiC) based MOSFETs or IGBTs, Gallium-Nitride (GaN) based MOSFETs or IGBTs, optical/electrical relays, and/or silicon controlled rectifiers (SCR).

The operation of each switch 435a, 436a, 435b, 436b is discussed in greater detail next. The first sensor switch 436a includes terminals 471a, 471b, 471c. The terminal 471a is electrically connected to the first motor controller 422a. The terminal 471b is connected to a first output sensor 455a. The terminal 471c is electrically connected to a second output sensor 455b. The output sensors 455a, 455b measure the speed and/or position of the rotors 149a, 149b or produce data from which the speed and/or position of the rotors 149a, 149b, respectively, may be derived. Each output sensor 455a, 455b may be, for example a sensor that measures the speed and/or position of the rotors 149a, 149b. For example, the output sensors 455a, 455b may be an encoder, that is mounted to the respective rotor 149a, 149b (FIG. 1) or one more Hall effect sensors. Each of the output sensors 455a, 455b may include three Hall effect sensors or other types of sensors In the state A, the switch 436a electrically connects the terminals 471a and 471b, and the output sensor 455a is electrically connected to the first motor controller 422a. In the state B, the switch 436a electrically connects the terminals 471a and 471c, and the output sensor 455b is electrically connected to the first motor controller 422a. The first sensor switch 436a is in a neutral state when the terminal 471a is not electrically connected to the terminal 471b or the terminal 471c.

The first power delivery switch 435a includes terminals 472a, 472b, 472c. The terminal 472a is electrically connected to the power converter 424a. The terminal 472b is electrically connected to the motor 140a. The terminal 472c is electrically connected to the motor 140b. When the first power delivery switch 435a is in the state A, current flows between the terminals 472a and 472b, and the power converter 424a is electrically connected to the first motor 140a. When the first power delivery switch 435a is the in the state B, current flows between the terminals 471a and 472c, and the power converter 424a is electrically connected to the second motor 140b. The first power delivery switch 435a is in a neutral state when the terminal 472a is not electrically connected to the terminal 472b or 472c.

The second power delivery switch 435b includes terminals 473a, 473b, 473c. The terminal 473a is electrically connected to the power converter 424b. The terminal 473b is electrically connected to the first motor 140a. The terminal 473c is electrically connected to the second motor 140b. When the second power delivery switch 435b is in the state A, current flows between the terminals 473a and 473b, and the power converter 424b is electrically connected to the first motor 140a. When the second power delivery switch 435b is the in the state B, current flows between the terminals 473a and 473c, and the power converter 424b is electrically connected to the second motor 140b.

The second sensor switch 436b includes terminals 474a, 474b, 474c. The terminal 474a is electrically connected to the second motor controller 422b. The terminal 474b is connected to the output sensor 455a. The terminal 474c is connected to the output sensor 455b. In the state A, the switch 436b electrically connects the terminals 474a and 474b, and the output sensor 455a is electrically connected to the second motor controller 422b. In the state B, the switch 436b electrically connects the terminals 474a and 474c, and the output sensor 455b is electrically connected to the second motor controller 422b.

The state of the switches 435a and 436a determines the state of the switching network 430a, and the state of the switches 435b and 436b determines the state of the switching network 430b, as discussed below.

When the first power delivery switch 435a and the first sensor switch 436a are in the state A, the first switching network 430a is in the state A. When the first switching network 430a is in the state A, the motor drive 420a is electrically connected to the first motor 140a and the motor controller 422a receives an indication of the speed and/or position of the first motor 140a from the first output sensor 455a. Thus, the first motor 140a receives the motor power signal 441a, and the gating control signal 429a is based on information from the first output sensor 455a or determined based on a sensorless technique. In implementations in which a sensorless technique is employed, the output of the first sensor 455a is not used to determine the speed and/or position of the first motor 140a. In these implementations, the motor controller 422a estimates the speed and/or position of the first motor 140a based on properties (for example, phase, frequency, and/or amplitude of voltage and/or current) of the motor power signal 441a measured by the sensor system 433a and parameters of the motor 140a, and the motor controller 422a determines the gating control signal 429a based on the estimated speed and/or position and the motor parameters. Any sensorless technique known in the art may be used.

When the first power delivery switch 435a and the first sensor switch 436a are in the state B, the first switching network 430a is in the state B. When the first switching network 430a is in the state B, the motor drive 420a is electrically connected to the second motor 140b and the motor controller 422a receives an indication of the speed and/or position of the second motor 140b from the second output sensor 455b. Thus, the second motor 140b receives the motor power signal 441a, and the gating control signal 429a may be determined based on information from the second output sensor 455b or determined based on a sensorless technique. In implementations in which the gating control signal 429a is determined based on a sensorless technique, the output of the second output sensor 455b is not used. In these implementations, the motor controller 422a estimates the speed and/or position of the second motor 140b based on properties (for example, phase, frequency, and/or amplitude of voltage and/or current) of the motor power signal 441a measured by the sensor system 433a and parameters of the motor 140b, and the motor controller 422b determines the gating control signal 429b based on the estimated speed and/or position and the motor parameters. Any sensorless technique known in the art may be used.

When the second power delivery switch 435b and the second sensor switch 436b are in the state A, the second switching network 430b is in the state A. When the second switching network 430b is in the state A, the motor drive 420b is electrically connected to the first motor 140a and the motor controller 422b receives an indication of the speed and/or position of the first motor 140a from the first output sensor 455a. Thus, the first motor 140a receives the motor power signal 441b, and the gating control signal 429b is based on information from the first output sensor 455a or determined based on a sensorless technique. In implementations in which a sensorless technique is employed, the output of the first sensor 455a is not used to determine the speed and/or position of the first motor 140a. In these implementations, the motor controller 422b estimates the speed and/or position of the first motor 140a based on properties (for example, frequency, phase, and/or amplitude of voltage and/or current) of the motor power signal 441b measured by the sensor system 433b and parameters of the motor 140a, and the motor controller 422b determines the gating control signal 429b based on the estimated speed and/or position and the motor parameters. Any sensorless technique known in the art may be used.

When the second power delivery switch 435b and the second sensor switch 436b are in the state B, the second switching network 430b is in the state B. When the second switching network 430b is in the state B, the motor drive 420b is electrically connected to the second motor 140b and the motor controller 422b receives an indication of the speed and/or position of the second motor 140b from the second output sensor 455b. Thus, the second motor 140b receives the motor power signal 441b, and the gating control signal 429b is based on information from the second output sensor 455b or determined based on a sensorless technique. In implementations in which the gating control signal 429b is determined based on a sensorless technique, the output of the second output sensor 455b is not used. In these implementations, the motor controller 422b estimates the speed and/or position of the second motor 140b. In these implementations, the motor controller 422b estimates the speed and/or position of the first motor 140b based on properties (for example, frequency, phase, and/or amplitude of voltage and/or current) of the motor power signal 441b measured by the sensor system 433b and parameters of the motor 140b, and the motor controller 422b determines the gating control signal 429b based on the estimated speed and/or position and the motor parameters. Any sensorless technique known in the art may be used.

The motor and drive system 400A also includes a plurality of temperature sensors 495. The temperature sensors 495 may be, for example, thermocouples or any other device capable of measuring temperature. The motor and drive system 400A includes a temperature sensor associated with each of the electronic processing module 425a, the electronic processing module 425b, the power converter 424a, the power converter 424b, the motor 140a, and the motor 140b. The temperature sensors 495 measure the temperature of these respective items and provide an output that includes an indication of the temperature of the item.

Referring to FIG. 4B, a block diagram of a motor and drive system 400B is shown. The motor and drive system 400B includes a motor and zone controller 410B. The motor and zone controller 410B is a dual-zone motor controller apparatus and is referred to as the dual-zone motor controller apparatus 410B. The dual-zone motor controller apparatus 410B is another example of an implementation of the dual-zone motor controller apparatus 110 of FIG. 1. The dual-zone motor controller apparatus 410B is the same as the dual-zone motor controller apparatus 410A (FIG. 4A), except the dual-zone motor controller apparatus 410B includes first and second zone controllers 490a_B, 490b_B that are implemented separately from, respectively, first and second motor drives 420a_B, 420b_B. The first motor drive 420a_B includes the electronic processing module 425a, the electronic storage 426a, and the I/O interface 427a. The second motor drive 420b_B includes the electronic processing module 425b, the electronic storage 426b, and the I/O interface 427b.

The first zone controller 490a_B includes an electronic processing module 491a, an electronic storage 492a, and an I/O interface 493a. The second zone controller 490b_B includes an electronic processing module 491b, an electronic storage 492b, and an I/O interface 493b. The electronic processing modules 491a, 491b are similar to the modules 425a and 426b. However, the electronic processing modules 491a, 491b are separate from the modules 425a, 425b and are exclusively used to execute instructions that implement the respective first and second zone controllers 490a_B, 490b_B.

The first zone controller 490a_B and the second zone controller 490b_B communicate with the host controller 150 via respective communications links 451a, 451b. Each communication link 451a, 451b is similar to the communication link 151 discussed above with respect to FIG. 3. The first zone controller 490a_B communicates with the first motor drive 420a_B. The first motor drive 420a_B does not directly communicate with the host controller 150. Similarly, the second zone controller 490b_B communicates with the second motor drive 420b_B. The second motor drive 420b_B does not directly communicate with the host controller. The first zone controller 490a_B and the second zone controller 490b_B are able to communicated with each other directly via a bi-directional communication path 494.

Figure 5:
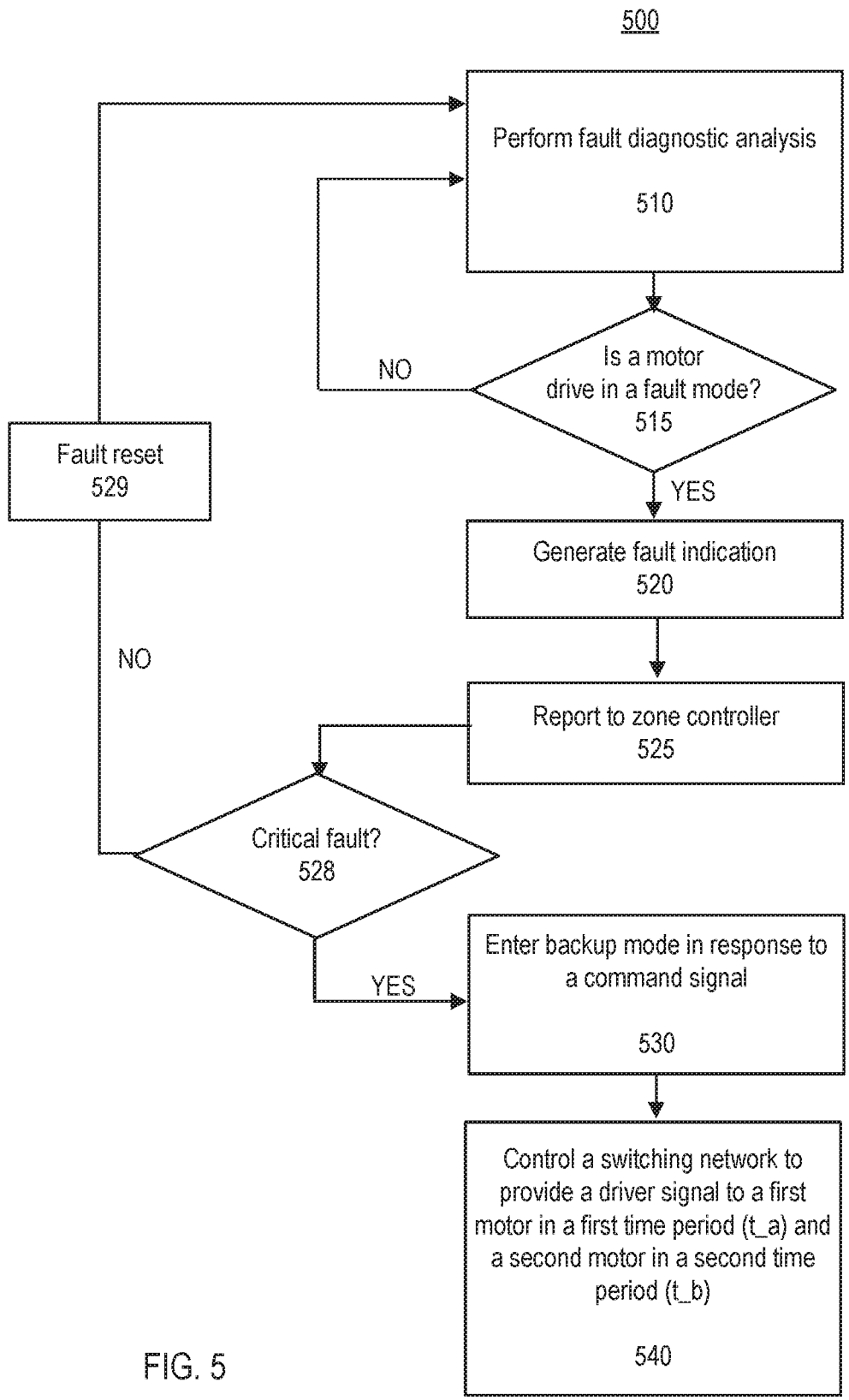
FIG. 5 is a flow chart of an example back-up mode process.

Referring to FIG. 5, a flow chart of a process 500 is shown. The process 500 is an example of a backup mode process that may be executed by, for example, any of the first motor drive 120a (FIG. 1), the second motor drive 120b (FIG. 1), the first motor drive 420a (FIG. 4A), or the second motor drive 420b (FIG. 4A). For example, the process 500 may be executed by the electronic processing module 425a or the electronic processing module 425b (FIG. 4A). Although the process 500 may be performed by the various apparatuses and systems discussed above, the process 500 is discussed with respect to the dual-zone motor controller apparatus 410A of FIG. 4A and the dual-zone motor controller apparatus 410B of FIG. 4B.

Prior to the beginning of the process 500, the dual-zone motor controller apparatus 410A is operating under typical operating conditions. The first switching network 430a is in the state A and the second switching network 430b is in the state B. Thus, the first motor drive 420a generates the motor power signal 441a and provides the motor power signal 441a to the first motor 140a. The first motor drive 420a receives an indication of the speed and/or position of the rotor 149a from the output sensor 455a and an indication of one or more electrical quantities in the motor power signal 441a from the sensor system 433a. In some implementations, the speed and/or position of the rotor 149a is estimated from the one or more electrical quantities measured by the sensor system 433a instead of being determined from data from the output sensor 455a.

The second motor drive 420b generates the motor power signal 441b and provides the motor power signal 441b to the second motor 140b. The second motor drive 420b receives an indication of the speed and/or position of the rotor 149b from the output sensor 455b and an indication of one or more electrical quantities in the motor power signal 441b from the sensor system 433b. In some implementations, the speed and/or position of the rotor 149b is estimated from the one or more electrical quantities measured by the sensor system 433b instead of being determined from data from the output sensor 455b.

Information about the dual-zone motor controller apparatus 410A is analyzed to determine whether the motor drive 420a or the motor drive 420b are in the fault mode (510). The analysis is referred to as fault diagnostic analysis. The motor drive 420a or the motor drive 420b are in a critical fault mode when any critical fault condition preventing the motor drive from resetting itself and running again is present. Critical faults include, for example, an inverter circuit over temperature fault, a power semiconductor failure, a processor fault or failure, and an overcurrent lockout, just to name a few. The information may include, for example, the overcurrent fault indication from the sensor system 433*a* or the sensor system 433*b*, temperature information from one or more of the temperature sensors 495, and/or the indication from the output sensor 455*a* or the output sensor 455*b*. The information may be analyzed by comparing the information to a specification that is stored in the electronic storage 426*a* and the electronic storage 426*b*.

Any critical fault determined by various diagnostic and/or protection algorithms may lead to a determination that a motor drive is in the critical fault mode. For example, the electronic storage 426*a* may store a specification related to the typical or acceptable properties of the motor power signal 441*a*, the motor drive 420*a*, and/or the speed and/or position of the rotor 149*a*. In some implementations, the specification includes a range of amplitude and/or frequency values that are acceptable for the motor power signal 441*a*. In these implementations, the motor drive 420*a* compares the indication from the sensor system 433*a* to determine whether the motor power signal 441*a* is within the specification. For example, in some circumstances, the motor drive 420*a* is unable to generate the motor power signal 441*a* when in the fault mode. The sensor system 433*a* provides an indication that no motor power signal 441*a* is present to the motor drive 420*a*, and the indication is compared to the specification and determined to not meet the specification. The specification also may include a range of speed and/or position values that are expected of the rotor 149*a*. The indication from the output sensor 455*a* (or, in an implementation that uses a sensorless technique, the estimate of the speed and/or position based on information from the sensor system 433*a*) is compared to the specification to determine whether the motor drive 420*a* is in the fault mode. In another example, the electronic storage 426*a* stores a specification related to typical or acceptable temperature values. For example, the electronic storage 426*a* may store a range of temperatures associated with acceptable operating temperatures of the electronic processor 425*a* and/or the power converter 424*a*. The temperature measured by an appropriate one of the temperature sensors 495 is compared to the temperature specification to determine whether the motor drive 420*a* is in a fault mode.

The electronic storage 426*b* of the second motor drive 420*b* stores a similar specification and the electronic processing module 425*b* performs similar comparisons to determine whether to generate a fault indication.

Whether or not the motor drive 420*a* or the motor drive 420*b* is in a fault mode is determined based on the fault diagnostic analysis (515).

If the motor drive 420*a* and the motor drive 420*b* are not in a fault mode, the process 500 returns to (510). If the motor drive 420*a* or the motor drive 420*b* is in the fault mode, a fault indication is generated (520). The fault indication also provides the fault level. The possible fault levels are: warning, resettable fault and critical fault (non-resettable). The fault indication is generated by the motor drive 420*a* or the motor drive 420*b*, and the fault indication is generated when one of the motor drives 420*a*, 420*b* is in a fault mode.

The fault indication is reported to the respective zone controller (525). For example, if the motor drive 420*a* (FIG. 4A) is in the fault mode, the fault level is reported to the zone controller 490*a*. If the motor drive 420*b* (FIG. 4A) is in the fault mode, the fault level is reported to the zone controller 490*b*. If the motor drive 420*a*_B (FIG. 4B) is in the fault mode, the fault level is reported to the zone controller 490*a*_B. If the motor drive 420*b*_B (FIG. 4B) is in the fault mode, the fault level is reported to the zone controller 490*b*_B.

The respective zone controller may provide the generated fault indication to the host controller 150 via the communication link 151. The fault indication may be provided to the host controller 150 as, for example, a message. The fault indication may include information that identifies which of the motor drives 420*a*, 420*b* (or 420*a*_B, 420*b*_B) generated the fault indication and which of the motor drives 420*a*, 420*b* is potentially experiencing a critical fault. In implementations such as FIG. 4B, the motor drive that is in the fault mode provides the fault indication to the respective zone controller 490*a*_B, 490*b*_B, which provides the fault indication to the host controller 150. For example, if the motor drive 420*a*_B is in a fault mode, the electronic processing module 425*a* provides the fault indication to the electronic processing module 491*a*. The electronic processing module 491*a* communicates the fault indication to the host controller 150 via the communication link 151. The host controller 150 determines whether the motor drive 420*a*_B has a critical fault based on the fault indication. If the motor drive 420*a*_B has a critical fault, the host controller 150 causes the second zone controller 490*b*_B to place the motor drive 420*a*_B in the backup mode.

In some implementations, the generated fault indication is provided by the faulted motor drive to the other motor drive. For example, if the motor drive 420*a* (FIG. 4A) has a fault condition and generates a fault indication, the motor drive 420*a* may provide the fault indication directly to the motor drive 420*a* (FIG. 4A) via a bi-directional communications link 457. In another example, if the motor drive 420*a*_B has a fault condition and generates a fault indication, the first zone controller 490*a*_B (FIG. 4B) may provide the fault indication directly to the second zone controller 490*b*_B (FIG. 4B) via the communications path 494 (FIG. 4B). The zone controller that receives the fault indication determines whether the fault mode is associated with a critical fault (528). If the fault mode is not associated with a critical fault, the process 500 performs a fault reset process 529 to clear the fault indication and returns to (510) or ends.

If the fault mode is associated with a critical fault, the dual-zone motor controller apparatus 410A (or 410B) enters a backup mode in response to receiving a command signal from a zone controller (530). The command signal may be generated by an electronic processor that is separate from the motor drive that has the critical fault. In some implementations, such as the implementation shown in FIG. 4A, the host controller 150 generates the command signal and provides the command signal to the motor drive 420*a* or 420*b* directly by providing the command signal to the zone controller 490*a* or 490*b*. In other implementations, such as the implementation shown in FIG. 4B, the host controller 150 generates the command signal and provides the command signal to the motor drive 420*a*_B or 420*b*_B via the respective zone control processing module 491*a*, 491*b*.

To provide a more specific example, and referring to FIG. 4A, if the motor drive 420*b* generated the fault indication, the command signal is provided to the zone controller 490*a*. The processing module 425*a* executes instructions in response and causes the motor drive 420*a* to enter the backup mode. If the motor drive 420*a* generated the fault indication, the command signal causes the motor drive 420*b* to enter the backup mode in a similar manner. In other words, the host controller 150 provides the control signal to the one of the motor drives 420*a*, 420*b* that is not in the fault mode.

In some implementations, the command signal is generated by the one of the motor drives 420*a*, 420*b* and provided to the other motor drive directly via the communications link 457 (FIG. 4A). For example, the motor drive 420a may provide the fault indication to the motor drive 420b, and the motor drive 420b enters the backup mode in response to receiving the fault indication from the motor drive 420a. Thus, although FIG. 4A illustrates the dual-zone motor controller apparatus 410A as being connected to the host controller 150, the host controller 150 is not required for operation of all of the implementations of the dual-zone motor controller apparatus 410. In other words, the dual-zone motor controller apparatus 410A may be used without the host controller 150. Similarly, the dual-zone motor controller apparatus 410B (FIG. 4B) may be used without the host controller 150.

The operations that define the backup mode may be stored as a collection of instructions (such as a computer program or a function) on each of the electronic storage 426a and the electronic storage 426b. When the motor drive 420a is commanded to enter the backup mode, the collection of instructions stored on the electronic storage 426a are executed by the electronic processing module 425a such that the motor drive 420a implements the backup mode. Similarly, when the motor drive 420b is commanded to enter the backup mode, the collection of instructions stored on the electronic storage 426b are executed by the electronic processing module 425b such that the motor drive 420b implements the backup mode.

In the backup mode, the switching network 430a or the switching network 430b is controlled such that a motor power signal from the one of the motor drives 420a, 420b that is not in the fault mode is provided to the first motor 140a during a first time period (t_a) and to the second motor 140b during a second time period (t_b) (540). For example, if the motor drive 420a is in the fault mode, the motor drive 420b is commanded to operate in the backup mode and the motor drive 420a is commanded to enter a disconnection mode. To enter the disconnection mode, the motor controller 422a provides a signal along a trace 485a (FIG. 4A) to the switching network 430a that causes the first sensor switch 436a and the first power delivery switch 435a to transition to the neutral state. For example, the motor controller 422a may provide a voltage signal to the gate of one or more transistors in the switching network 430a that is sufficient to change the first power delivery switch 435a and the first sensor switch 436a to the neutral state. When the first switching network 430a is in the neutral state, current is not able to flow in the first sensor switch 436a or the first power delivery switch 435a. After the switching network 430a transitions to the neutral state, the motor drive 420a may provide a signal to the motor drive 420b indicating that the switching network 430a is in the neutral state.

The motor drive 420b then begins to operate in the backup mode. In the backup mode, the motor drive 420b generates the motor power signal 441b. The motor controller 422b controls the switching network 430b such that the motor power signal 441b is alternately provided to the first motor 140a and the second motor 140b.

The motor controller 422b provides a signal via the trace 485b to the switching network 430b to control the state of the switching network 430b. For example, the motor controller 422b may provide a voltage signal to the gate of one or more transistors in the switching network 430b to control the state of the switching network 430b. In the backup mode, the motor controller 422b controls the state of the switching network 430b such that the state of the switching network 430b alternates between the state A and the state B. When the switching network 430b is in the state B, the motor power signal 441b is provided to the second motor 140b, and the motor controller 422b receives the indication of the position and/or speed of the rotor 149b from the output sensor 455b. When the switching network 430b is in the state A, the motor power signal 441b is provided to the first motor 140a, and the motor controller 422b receives the indication of the position and/or speed of the rotor 149a from the output sensor 455a.

The motor controller 422b controls the switching network 430b to be in the state A for a first time period (t_a) and in the state B for a second time period (t_b). The beginning and end of the first and second time periods t_a, t_b is determined by the zone controller associated with the motor drive that is not in the fault mode. For example, the beginning and end of the first and second time periods t_a, t_b may be determined based on data from the host controller 150 and a sensor that provides data to the zone controller. The sensors 165a and 165b (FIG. 1) are examples of such a sensor.

The first and second time periods t_a, t_b are different time periods that do not overlap. The first time period t_a may be before or after the second time period t_b. The first time period t_a and the second time period t_b do not overlap in time but may be adjacent to each other in time. For example, the second time period t_b may begin within a second of the first time period t_a ending. The minimum amount of time between the first time period t_a and the second time t_b period is the time required to transition the switching network 430b from state A to state B and vice versa. The temporal duration of the first and second time periods t_a, t_b may vary depending on the application that relies on the motors 140a and 140b. For example, the temporal duration of the first time period t_a and the second time period t_b may be based on data from an external sensor that communicates with the host controller 150 and/or the zone controller. In these implementations, the host controller 150 may provide a command signal to the dual-zone motor controller 410A to end or begin a time period. In some implementations, pre-determined durations for the first and second time periods t_a, t_b are stored on the electronic storage 426a and 426b.

The temporal duration of the first and second time periods t_a, t_b may be the same or different. In other words, the switching network 430a may be controlled to be in the state A for the same amount of time or for a different amount of time as it is controlled to be in the state B. Furthermore, the motor controller 422b may control the switching network 430b to alternate between the state A and the state B for any length of time. Thus, although the example above discusses a first time period t_a and a second time period t_b, the motor drive 420b may control the switching network 430b to alternate between the state A and the state B for more than two time periods.

The motor drive 420a has a backup mode that operates in a similar manner. When the motor drive 420b is in the fault mode, the switching network 430b is placed in the neutral state, and the motor drive 420a enters the backup mode in response to a command from the host controller 150. In the backup mode, the motor drive 420a generates the motor power signal 441a. The motor controller 422a controls the switching network 430a such that the motor power signal 441a is alternately provided to the first motor 140a and the second motor 140b. The motor controller 422a provides a signal via the trace 485a to the switching network 430a to control the state of the switching network 430a. In the backup mode, the motor controller 422a controls the state of the switching network 430a such that the state of the switching network 430a alternates between the state A and the state B. When the switching network 430*a* is in the state A, the motor power signal 441*a* is provided to the second motor 140*a*, and the motor drive 420*a* receives the indication of the position and/or speed of the rotor 149*a* from the output sensor 455*a*. When the switching network 430*a* is in the state B, the motor power signal 441*a* is provided to the second motor 140*b*, and the motor drive 420*a* receives the indication of the position and/or speed of the rotor 149*b* from the output sensor 455*b*.

FIG. 6 is a block diagram of a conveyor belt system 600 that includes N instances of the dual-zone motor controller apparatus 410A (FIG. 4A), each of which is connected to the host controller 150 through the communications link 151. The instances of the dual-zone motor controller apparatus 410A in FIG. 6 are labeled as 410, 410-2, . . . 410-N, where N is any integer number that is greater than two. Thus, the conveyor belt system 600 includes at least three instances of the dual-zone motor controller apparatus 410. In other implementations, the conveyor belt system 600 includes two or a single instance of the dual-zone motor controller apparatus 410.

The dual-zone motor controller apparatus 410A drives motors 140*a* and 140*b*. The motor 140*a* is connected to a roller 646-1*a*. When the motor 140*a* receives a motor power signal from the dual-zone motor controller apparatus 410, the motor 140*a* operates and causes the roller 646-1*a* to rotate about the Z axis. The roller 646-1*a* and a roller 662-1*a* (which is identical to the roller 646-1*a*) make physical contact with a belt 647-1*a*. The belt 647-1*a* is a continuous piece of flexible material that encircles the roller 646-1*a* and the roller 662-1*a*. When the roller 646-1*a* rotates about the axis, the belt 647-1*a* moves in a loop and the roller 662-1*a* also rotates. In this way, an object 664 (for example, a box) moves through the conveyor belt system 600. Several rollers are linked together by belts to form a zone. For example, in FIG. 6, the roller 646-1*a*, the roller 662-1*a*, and the belt 647-1*a* form a zone 645-1*a*.

The motor 140*b* drives a roller 646-1*b* in a similar manner. The roller 646-1*b* and a roller 662-1*b* are encircled and make physical contact with a belt 647-1*b*. The roller 646-1*b*, the roller 662-1*b*, and the belt 647-1*b* form a zone 645-1*b*. The other zones in the conveyor belt system 600 are similarly formed.

The conveyor belt system 600 also includes sensors 665 that sense when the object 664 enters or is nearing a particular one of the zones, and when the object 664 leaves a zone. The sensors 665 may be, for example, optical sensors that detect when the object 664 passes a particular point in the conveyor belt system 600. Each of the sensors 665 is coupled to the zone controllers 490*a*, 490*b* that are in one instance of the dual-zone motor controller apparatus 410, 410-1, . . . 410-N. Each sensor 665 provides the indication of the location of the object 664 to the zone controllers 490*a*, 490*b*. The zone controllers 490*a*, 490*b* in a particular one of the dual-zone motor controller apparatuses 410, 410-2, . . . 410-N may provide the indication of the location to the host controller 150. The host controller 150 may use the indication of the location of the object 664 to command a particular one or ones of the dual-zone motor controller apparatuses 410, 410-2, . . . 410-N to activate their respective zones only when the object 664 is in or approaching a certain zone. In this way, not all of the motors in the conveyor belt system 600 are necessarily operating at all times. Although the example of FIG. 6 includes the host controller 150, the dual-zone motor controller apparatus 410, 410-2, . . . 410-N may operate without the host controller 150 as discussed, for example, with respect to FIG. 4A. Thus, the conveyor belt system 600 may be implemented without the host controller 150, and the motor controller apparatuses 410, 410-2, . . . , 410-N may communicate directly with each other.

Figure 7:
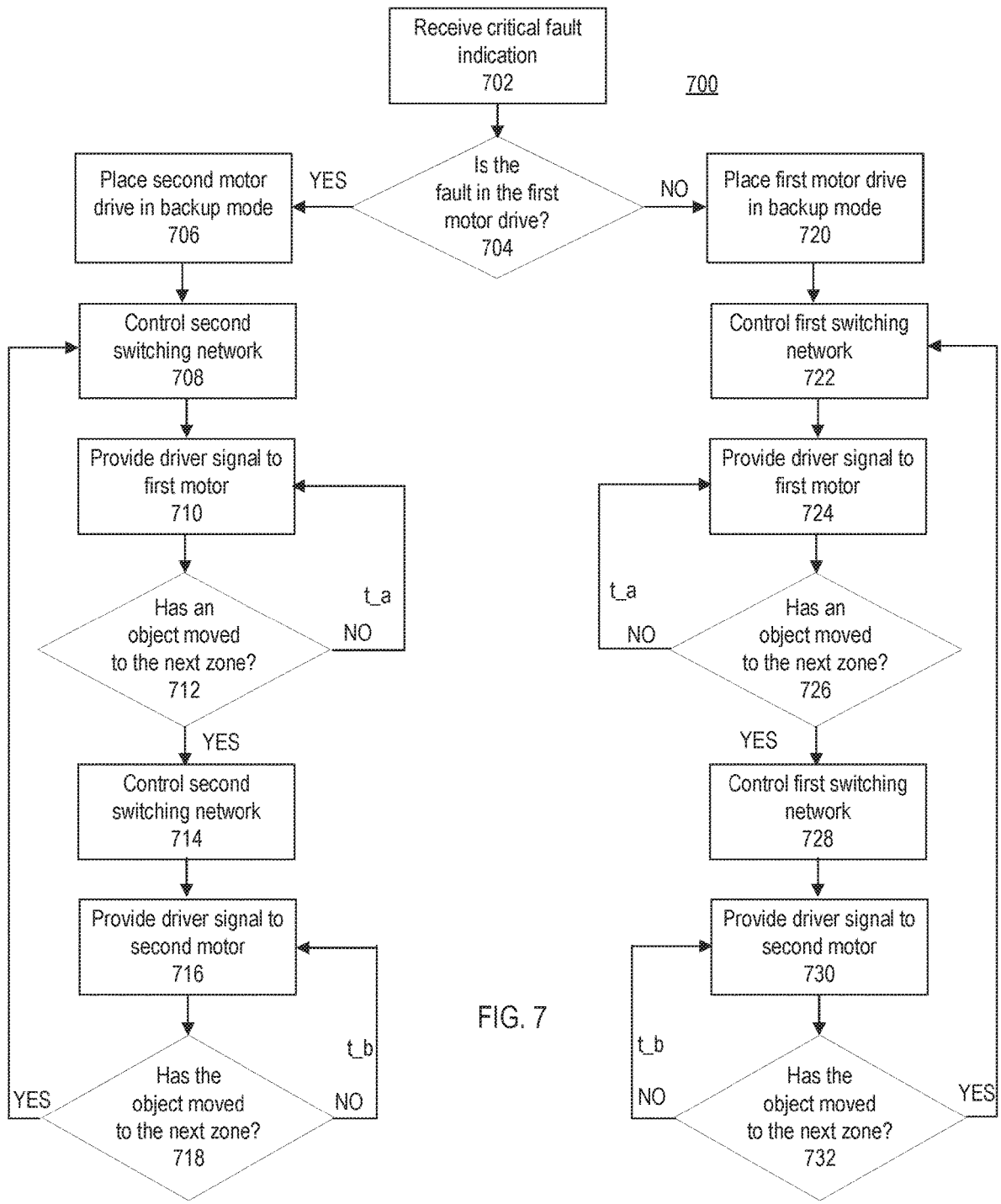
FIG. 7 is a flow chart of an example process for managing a conveying process.

FIG. 7 is a flow chart of a process 700. The process 700 is an example process for managing a conveyor belt system that uses electric motors to move the conveyor belt. The process 700 is discussed with respect to the conveyor belt system 600 of FIG. 6 and the dual-zone motor controller apparatus 410A of FIG. 4A. The process 700 may be performed by the host controller 150 and the dual-zone motor controller apparatuses 410, 410-2, . . . 410-N (each of which is an instance of the apparatus 410A and has the same components as the apparatus 410). In some implementations, the process 700 is performed without the host controller 150, and the motor controller apparatuses 410, 410-2, . . . , 410-N may communicate directly with each other.

Prior to the process 700 beginning, the conveyor belt system 600 is performing in an expected or typical manner, and none of the dual-zone motor controller apparatuses 410, 410-2 . . . 410-N have a fault condition. The dual-zone motor controller apparatus 410A has indicated to the host controller 150 that the object 664 is in the zone 645-1*a*. In the example discussed below, the object 664 moves in the X direction.

The host controller 150 receives a critical fault indication (702). The critical fault indication is any type of indication that informs the host controller 150 that a critical fault condition exists in one of the dual-zone motor controller apparatuses 410, 410-2 . . . 410-N. The critical fault indication may be received from any of the dual-zone motor controller apparatuses 410, 410-2 . . . 410-N. A critical fault condition exists when dual-zone motor controller apparatus is unable to provide an acceptable motor power signal for two separate motors. The fault indication may be, for example, a message. The critical fault indication includes information that identifies which of the dual-zone motor controller apparatuses 410, 410-2, . . . 410-N provided the indication and which of the two motor drives in the identified motor controller apparatus has failed.

After receiving the fault indication, the host controller 150 or a zone controller in one of the dual-zone motor controllers interrupts the typical operation of the conveyor belt system 600 initiates a fault control mode. The host controller 150 or the zone controller determines which of the motor controller apparatuses 410, 410-2, . . . 410-N provided the fault indication. In the example discussed below, the dual-zone motor controller apparatus 410A provides the fault indication and has a critical fault condition. The dual-zone motor controller apparatus 410A shown in FIG. 6 is the same as the dual-zone motor controller apparatus 410A (FIG. 4).

The host controller 150 and/or the zone controller in the identified dual-zone motor controller determines whether the critical fault is in the first motor drive 420*a* or second the motor drive 420*b* (704) based on the fault indication in the message(s). The example of the critical fault being in the first motor drive 420*a* is discussed first.

If the critical fault is in the first motor drive 420*a*, the host controller 150 provides a command signal to the zone controller 490*b* of the dual-zone motor controller apparatus 410A via the communications link 151, or the first zone controller 490*a* provides a command signal to the zone controller 490*b* via the communications like 457. The zone controller 490*b* places the second motor drive 420*b* in the backup mode in response to receiving the command signal (706). The first motor controller 422*a* places the first switching network 430*a* in the neutral state. The second motor controller 422b controls the second switching network 430b such that the second motor drive 420b is electrically connected to the first motor 140a (708). In this example, the second motor controller 422b causes the second switching network 430b to transition to or remain in the state A. The second motor drive 420b is turned on and the motor power signal 441b is generated. Due to the configuration of the second switching network 430b, the motor power signal 441b is provided to the first motor 140a. This allows the motor 140a to operate and to rotate the roller 646-1a. Thus, the object 664 continues to move in the X direction.

The second switching network 430b remains in state A and the motor power signal 441b continues to power the first motor 140a during a first time period t_a (710). In the example of the process 700, the first time period t_a is the length of time required for the belt 647-1a to convey the object 664 to the next zone (the zone 645-1b).

The zone controller 490b continues to receive data from the sensors 665 and the zone controller 490a (or other zone controllers), and the sensors 665 provides an indication to the zone controller 490a when the object 664 enters the zone 645-1b. The object 664 is considered to have entered the zone 645-1b when at least a portion of the object 664 is on the belt 647-1b. If the object 664 has entered the zone 645-1b (712), the zone controller 490b causes the second motor controller 422b to transition the second switching network 430b to the state B (714). In the state B, the second motor drive 420b is electrically connected to the motor 140b. As shown in FIG. 6, the second motor 140b is connected to the roller 646-1b. When the roller 646-1b rotates, the belt 647-1b moves and the object 664 is conveyed through the zone 645-1b. The second motor drive 420b again generates the motor power signal 441b, which is provided to the second motor 140b (716).

The second motor drive 420b continues to provide the motor power signal 441b to the second motor 140b for a second time period t_b. The second time period t_b begins when the switching network 430b is transitioned from the state A to the state B and ends when the object 664 enters the next zone (the zone 645-2a). The host controller 150 or the zone controller 490b determines whether the object 664 has left the zone 645-1 and entered the next zone (the zone 645-2a) based on data from the sensor 665 and/or from other zone controllers (for example, the zone controller 490a) (718). If the object 664 has not entered the zone 645-2a, the second time period t_b continues and the second motor drive 420b continues to provide the motor power signal 441b to the motor 140b. If the object 665 has entered the zone 645-2a, the zone controller 490b commands the motor drive 420b to stops producing the motor power signal 441b and the process 700 returns to (708). As discussed above, in (708), the motor drive 420b transitions the switching network 430b to state A in (708). Thus, after the second time period t_b, the switching network 430b is set such that the dual-zone motor controller apparatus 410A is configured to provide the motor power signal 441b to the first motor 140a such that an object that enters the zone 645-1a at a later time moves through the zone 645-1a.

Thus, due to the configuration of the dual-zone motor controller apparatus 410, the object 664 continues to progress through the conveyor belt system 600 even though the motor drive 420b has a critical fault condition or is in a fault mode.

If the critical fault condition is in the second motor drive 420b, the first motor drive 420a is placed in the backup mode (720). The second switching network 430b is transitioned to the neutral state. The first motor controller 422a controls the first switching network 430a (722). In this example, the object is in the zone 645-1a when the fault occurs. The first zone controller 490a thus commands the first motor controller 422a to initially transition the first switching network to the state A such that the motor 140a (which is associated with the zone 645-1a) will continue to receive the motor power signal 441a. The motor drive 420a provides the motor power signal 441a to the first motor 140a (724). The motor drive 420a continues to provide the motor power signal 441a to the first motor 140a over a first time period t_a, which lasts until the object 664 moves into the next zone (the zone 645-1b).

The first zone controller 490a continues to receive data from the sensors 665 and from other zone controllers (for example, the zone controller 490b), and the sensors 665 provides an indication to the first zone controller 490b when the object 664 enters the zone 645-1b. If the object 664 has entered the zone 645-1b (726), the first zone controller 490b provides a command to the dual-zone motor controller apparatus 410A such that the first motor controller 422a transitions the second switching network 430a to the state B (728). In the state B, the first switching network 430a electrically connects the first motor controller 422a to the second motor 140b. Thus, the second motor 140b receives the motor power signal 441b and rotates such that the object 664 progresses through the second zone 645-1b.

The first motor driver 420a continues to provide the motor power signal 441a to the second motor 140b for a second time period t_b. The second time period t_b begins when the switching network 430a is transitioned from the state A to the state B and ends when the object 664 enters the next zone (the zone 645-2a). The first zone controller 490a determines whether the object 664 has entered the next zone (the zone 645-2a) based on data from the sensor 665 and from other zone controllers (for example, the zone controller 490b) (732). If the object 664 has not entered the zone 645-2a, the second time period t_b continues and the first motor drive 420a continues to provide the motor power signal 441a to the second motor 140b. If the object 665 has entered the zone 645-2a, the motor drive 420a stops producing the motor power signal 441a and the process 700 returns to (722). As discussed above, in (722), the motor controller 422a transitions the switching network 430a to state A in (722). Thus, after the second time period t_b, the switching network 430a is set such that the dual-zone motor controller apparatus 410A is configured to provide the motor power signal 441a to the first motor 140a for an object that enters the zone 645-1a at a later time.

Other implementations are within the scope of the claims.

For example, each of the dual-zone motor controller apparatus 410A and the dual-zone motor controller apparatus 410B may be implemented on a printed circuit board (PCB) 480. The perimeter or outer boundary of the PCB 480 is shown with a dash-dot-dot line style. The solid lines that connect two elements within the boundary of the PCB 480 are electrically conductive traces. The traces may be implemented with any electrically conductive material such as, for example, copper. The various electronic components on the PCB 480 such as, for example, the first and second motor controllers 422a, 422b; the first and second zone controllers 490a, 490b; the first and second power converter 424a, 424b; the sensor systems 433a, 433b; and the switching networks 430a, 430b are implemented from components that are mountable on the PCB 480. The PCB 480 may include connection components that allow the traces and various components mounted on the PCB 480 to more easily connect to components that are external to the PCB 480, such as the motors 140*a*, 140*b* and the DC power source 470. The connection components may include, for example, terminal blocks.

Other implementations are possible. For example, more than one PCB may be used to implement the dual-zone motor controller apparatus 410B of FIG. 4B. In some implementations, the first and second zone controllers 490*a*_B, 490*b*_B are mounted on a PCB that is separate from a PCB upon which the other components of the dual-zone motor controller apparatuses 410B are mounted. Moreover, the zone controllers 490*a*_B, 490*b*_B are located separate from the respective motor drive 420*a*_B, 420*b*_B. For example, the motor drives 420*a*_B, 420*b*_B may be in close proximity to the respective motors 140*a*, 140*b* and the zone controllers 490*a*_B, 490*a*_B may be located at a control panel or a remote location that is separate from the motor drives 420*a*_B, 420*b*_B. In these implementations, the zone controllers 490*a*_B, 490*b*_B are in communication with the respective motor drives 420*a*_B, 420*b*_B.

The examples discussed above relate to motor and zone controller apparatus that have two zones, with one zone controlling a single motor. However, the motor controller apparatus may be a multi-zone motor controller apparatus that includes more than two zones and is able to control more than two motors. For example, a single motor and zone controller apparatus may include three, four, or more instances of a zone controller and a motor drive that operate in parallel under ordinary conditions and that switch between providing power to a particular motor when one of the motor drives is in a fault mode.

What is claimed is:

1. A motor and zone controller apparatus comprising:
   a first motor drive;
   a second motor drive; and
   a switching apparatus comprising:
      a first switching network having at least a first state and a second state, wherein the first switching network connects the first motor drive to a first motor when in the first state, and the first switching network connects the first motor drive to a second motor when in the second state; and
      a second switching network having at least a first state and a second state, wherein the second switching network connects the second motor drive to the first motor when in the first state, and the second switching network connects the second motor drive to the second motor when in the second state.

2. The motor and zone controller apparatus of claim 1, wherein
   the first switching network comprises: a first power delivery switch, and a first sensor switch; and
   the second switching network comprises: a second power delivery switch, and a second sensor switch.

3. The motor and zone controller apparatus of claim 2, wherein
   when the first switching network is in the first state, the first power delivery switch is electrically connected to the first motor, and the first sensor switch is electrically connected to a first output sensor that measures a speed or position of the first motor;
   when the first switching network is in the second state, the first power delivery switch is electrically connected to the second motor, and the first sensor switch is electrically connected to a second output sensor that measures a speed or position of the second motor;
   when the second switching network is in the first state, the second power delivery switch is electrically connected to the first motor, and the second sensor switch is electrically connected to the first output sensor; and
   when the second switching network is in the second state, the second power delivery switch is electrically connected to the second motor, and the second sensor switch is electrically connected to the second output sensor.

4. The motor and zone controller apparatus of claim 1, further comprising:
   a first zone controller in communication with the first motor drive; and
   a second zone controller in communication with the second motor drive, wherein a state of the first switching network is configured to change in response to receiving a command signal from the first zone controller, and a state of the second switching network is configured to change in response to receiving a command from the second zone controller.

5. The motor and zone controller apparatus of claim 4, wherein the first zone controller and the second zone controller are coupled to a host controller, and the command signal is received at the first zone controller or the second zone controller from the host controller.

6. The motor and zone controller apparatus of claim 5, wherein a first motor controller is configured to determine whether the first motor drive is in a critical fault mode, and, if the first motor drive is in the critical fault mode, the command signal from a second motor controller is configured to control the state of the second switching network such that the second motor drive is connected to the first motor during a first time period and the second motor drive to the second motor during a second time period.

7. The motor and zone controller apparatus of claim 6, wherein, if the first motor drive is in the critical fault mode, the first time period and the second time period are determined by the second zone controller or by the host controller.

8. The motor and zone controller apparatus of claim 1, wherein the first motor drive comprises: a first motor controller, a first power converter, and a first zone controller; and the second motor drive comprises: a second motor controller, a second power converter, and a second zone controller.

9. The motor and zone controller apparatus of claim 8, wherein the first motor drive comprises a first motor control processor, the first zone controller comprises a first zone control processor, the second motor drive comprises a second motor control processor, and the second zone controller comprises a second zone control processor.

10. The motor and zone controller apparatus of claim 9, further comprising a first bi-directional communication path between the first zone controller and the second zone controller, and a second bi-directional communication path between the first motor controller and the second motor controller.

11. The motor and zone controller apparatus of claim 8, wherein the first motor controller and the first zone controller are implemented by a first electronic processor, and the second motor controller and the second zone controller are implemented by a second electronic processor.

12. The motor and zone controller apparatus of claim 8, wherein the first motor controller is implemented by a first electronic processor, the first zone controller is implemented by a second electronic processor, the second motor controller is implemented by a third electronic processor, and the second zone controller is implemented by a fourth electronic processor.

13. A control system for a dual-zone motor apparatus, the control system comprising:
- a host controller coupled to one or more dual-zone motor controller apparatuses, each of the one or more dual-zone motor controller apparatuses comprising:
  - a first motor drive comprising a first motor controller configured to generate a first motor power signal;
  - a second motor drive comprising a second motor controller configured to generate a second motor power signal;
  - a first zone controller coupled to the first motor controller;
  - a second zone controller coupled to the second motor controller; and
  - a switching apparatus comprising:
    - a first switching network configured to connect the first motor drive to a first motor or a second motor; and
    - a second switching network configured to connect the second motor drive to the first motor or the second motor, wherein
  - when the first motor drive is in a fault mode, the host controller or the second zone controller is configured to command the second motor drive to enter a backup mode, and, when in the backup mode, the second motor drive is configured to provide the second motor power signal to the first motor during a first time period and to provide the second motor power signal to the second motor during a second time period; and
  - when the second motor drive is in a fault mode, the host controller or the first zone controller is configured to command the first motor drive to enter a backup mode, and, when in the backup mode, the first motor drive is configured to provide the second motor power signal to the second motor during a first time period and to provide the first motor power signal to the second motor during a second time period.

14. The control system of claim 13, wherein the host controller is coupled to two or more dual-zone motor controller apparatus, and the host controller is further configured to adjust a speed of one or more motors controlled by another of the dual-zone motor controller apparatuses.

15. A method of operating a system that comprises a plurality of motors controlled by a multi-zone motor controller, the method comprising:
- determining whether one of a plurality of motor drives in a multi-zone motor controller is in a fault mode; and
- if at least one of the plurality of motor drives is in the fault mode:
  - controlling any one of the plurality of motor drives that is not in the fault mode to connect to each of the plurality of motors during a respective time period, each of the time periods being different from all of the other time periods.

16. The method of claim 15, wherein the system comprises two motors controlled by a dual-zone motor controller.

17. The method of claim 16, wherein controlling the one of the plurality of motor drives that is not in the fault mode to connect to each of the plurality of motors during a respective time period comprises controlling a state of a switching network connected to the one of the plurality of motor drives that is not in the fault mode such that the switching network connects the one of the plurality of motor drives that is not in the fault mode to each of the motors at a different time.

18. The method of claim 16, wherein controlling the one of the plurality of motor drives that is not in the fault mode to connect to each of the plurality of motors during a respective time period comprises receiving a command from a separate electronic processor.

19. The method of claim 18, wherein the command from a separate electronic processor is received from a host controller that is physically separate from the multi-zone motor controller apparatus.

20. The method of claim 18, wherein the command from a separate electronic processor is received from a zone control processor.

* * * * *